US011106376B2

(12) United States Patent
Xu et al.

(10) Patent No.: US 11,106,376 B2
(45) Date of Patent: *Aug. 31, 2021

(54) METHOD OF STORAGE ALLOCATION, ELECTRONIC DEVICE, STORAGE SYSTEM AND COMPUTER PROGRAM PRODUCT

(71) Applicant: Dell Products L.P., Round Rock, TX (US)

(72) Inventors: Xinlei Xu, Beijing (CN); Jian Gao, Beijing (CN); Ruiyong Jia, Beijing (CN); Liam Li, Beijing (CN); Yousheng Liu, Beijing (CN); Hongpo Gao, Beijing (CN)

(73) Assignee: Dell Products L.P., Round Rock, TX (US)

( * ) Notice: Subject to any disclaimer, the term of this patent is extended or adjusted under 35 U.S.C. 154(b) by 36 days.

This patent is subject to a terminal disclaimer.

(21) Appl. No.: 16/811,530

(22) Filed: Mar. 6, 2020

(65) Prior Publication Data
US 2020/0210089 A1 Jul. 2, 2020

Related U.S. Application Data

(63) Continuation of application No. 16/177,736, filed on Nov. 1, 2018, now Pat. No. 10,628,071.

(30) Foreign Application Priority Data

Jan. 18, 2018 (CN) .......................... 201810049315.3

(51) Int. Cl.
*G06F 3/06* (2006.01)
*G06F 11/34* (2006.01)
*G06F 11/10* (2006.01)

(52) U.S. Cl.
CPC .......... *G06F 3/0644* (2013.01); *G06F 3/0616* (2013.01); *G06F 3/0689* (2013.01); *G06F 11/1076* (2013.01); *G06F 11/3442* (2013.01)

(58) Field of Classification Search
None
See application file for complete search history.

(56) References Cited

U.S. PATENT DOCUMENTS 10,082,965 B1 9/2018 Tamilarasan et al.
2010/0077252 A1 3/2010 Siewert et al.
(Continued)

*Primary Examiner* — Kevin Verbrugge
(74) *Attorney, Agent, or Firm* — Ryan, Mason & Lewis, LLP

(57) ABSTRACT

Embodiments of the present disclosure provide a method of storage allocation, an electronic device, a storage system and a computer program product. The method of storage allocation includes: obtaining respective wear levels of a plurality of disks associated with a redundant array of independent disks (RAID). The method further includes: determining respective spare extents in disk extents of the plurality of disks based on the obtained wear levels, such that a number of spare extents in a disk is positively correlated with the wear level of the disk. The method also includes: selecting, from disk extents other than the spare extents, a predetermined number of disk extents for creating RAID extents for the RAID, the predetermined number of disk extents being from different disks of the plurality of disks. Through the embodiments of the present disclosure, a life cycle of a disk is prolonged, frequent replacement of worn disks with new disks is avoided, and data loss is reduced.

20 Claims, 8 Drawing Sheets

(56) References Cited

U.S. PATENT DOCUMENTS

| | | |
|---|---|---|
| 2010/0332749 A1 | 12/2010 | Benhase et al. |
| 2015/0380110 A1 | 12/2015 | Tamura et al. |
| 2020/0241806 A1* | 7/2020 | Dalmatov ........... G06F 11/2082 |
| 2020/0249872 A1* | 8/2020 | Dalmatov ............. G06F 3/0689 |

* cited by examiner

FIG. 2A

METHOD OF STORAGE ALLOCATION, ELECTRONIC DEVICE, STORAGE SYSTEM AND COMPUTER PROGRAM PRODUCT

RELATED APPLICATION(S)

The present application is a continuation of U.S. patent application Ser. No. 16/177,736, filed Nov. 1, 2018, and entitled "Method of Storage Allocation, Electronic Device, Storage System and Computer Program Product," which claims priority to Chinese Patent Application No. 201810049315.3, filed Jan. 18, 2018, and entitled "Method of Storage Allocation, Electronic Device, Storage System and Computer Program Product," each incorporated by reference herein in its entirety.

FIELD

Embodiments of the present disclosure generally relate to the field of data storage, and more specifically, to methods of storage allocation, electronic devices, storage systems and computer program products.

BACKGROUND

A redundant array of independent disks (RAID) significantly increases data throughput of a storage system by storing and reading data simultaneously on a plurality of disks. The rate attained using the RAID can be several times, tens of times or even hundreds of times greater than the rate of a single disk drive. A mapped RAID is a new RAID technology. Unlike the traditional RAID, the mapped RAID is created on top of a disk pool, instead of being created on several specific disks. A disk in the disk pool is divided into a series of fixed-sized, non-overlapping segments which are referred to as disk extents. A logical space of the mapped RAID is divided into a bunch of continuous, non-overlapping segments which are referred to as RAID extents. Each RAID extent consists of a plurality of disk extents selected from different disks based on a RAID policy. As compared with the traditional RAID, the mapped RAID has several advantages, such as capability of being rebuilt more rapidly, support of a single drive extension and support of drives of mixed sizes in a disk pool.

Currently, a so-called neighborhood matrix algorithm is used when the mapped RAID is created, to enable the RAID extents in the created RAID to be distributed evenly in a disk pool as much as possible. However, the RAID created through the neighborhood matrix algorithm, after serving input and output (IO) for a period of time, may cause life cycles of certain disks in the disk pool to be terminated, thereby resulting in data loss.

SUMMARY

Embodiments of the present disclosure provide methods of storage allocation for a mapped RAID, electronic devices, storage systems and computer program products.

In a first aspect of the present disclosure, a method of storage allocation is provided. The method comprises: obtaining respective wear levels of a plurality of disks associated with a redundant array of independent disks (RAID). The method further comprises: determining, based on the wear levels, respective spare extents from disk extents of the plurality of disks, such that a number of spare extents in a disk is positively correlated with the wear level of the disk. The method further comprises: selecting, from disk extents other than the spare extents in the disk extents, a predetermined number of disk extents for creating RAID extents for the RAID, the predetermined number of disk extents being from different disks of the plurality of disks.

In a second aspect of the present disclosure, an electronic device is provided. The electronic device comprises: at least one processor; and at least one memory comprising computer program instructions. The at least one memory and the computer program instructions are configured, together with the at least one processor, to cause the electronic device to: obtain respective wear levels of a plurality of disks associated with a redundant array of independent disks (RAID); determine, based on the wear levels, respective spare extents from disk extents of the plurality of disks, such that a number of spare extents in a disk is positively correlated with the wear level of the disk; and select, from disk extents other than the spare extents in the disk extents, a predetermined number of disk extents for creating RAID extents for the RAID, the predetermined number of disk extents being from different disks of the plurality of disks.

In a third aspect of the present disclosure, a computer program product is provided. The computer program product is tangibly stored on a non-transitory computer readable medium and comprises machine executable instructions. The machine executable instructions, when executed, cause a machine to perform any step of the method according to the first aspect of the present disclosure.

In a fourth aspect of the present disclosure, a storage system is provided. The storage system comprises a plurality of disks associated with a redundant array of independent disks (RAID) and an electronic device according to the second aspect of the present disclosure.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

The above and other objectives, features, and advantages of the present disclosure will become more apparent through the following detailed description on example embodiments of the present disclosure with reference to the accompanying drawings, in which the same reference numerals refer to the same elements in the example embodiments of the present disclosure.

FIG. 2A illustrates visually a diagram of a neighborhood matrix corresponding to an evenly distributed RAID in a 2-dimensional form;

DETAILED DESCRIPTION

Figure 1:
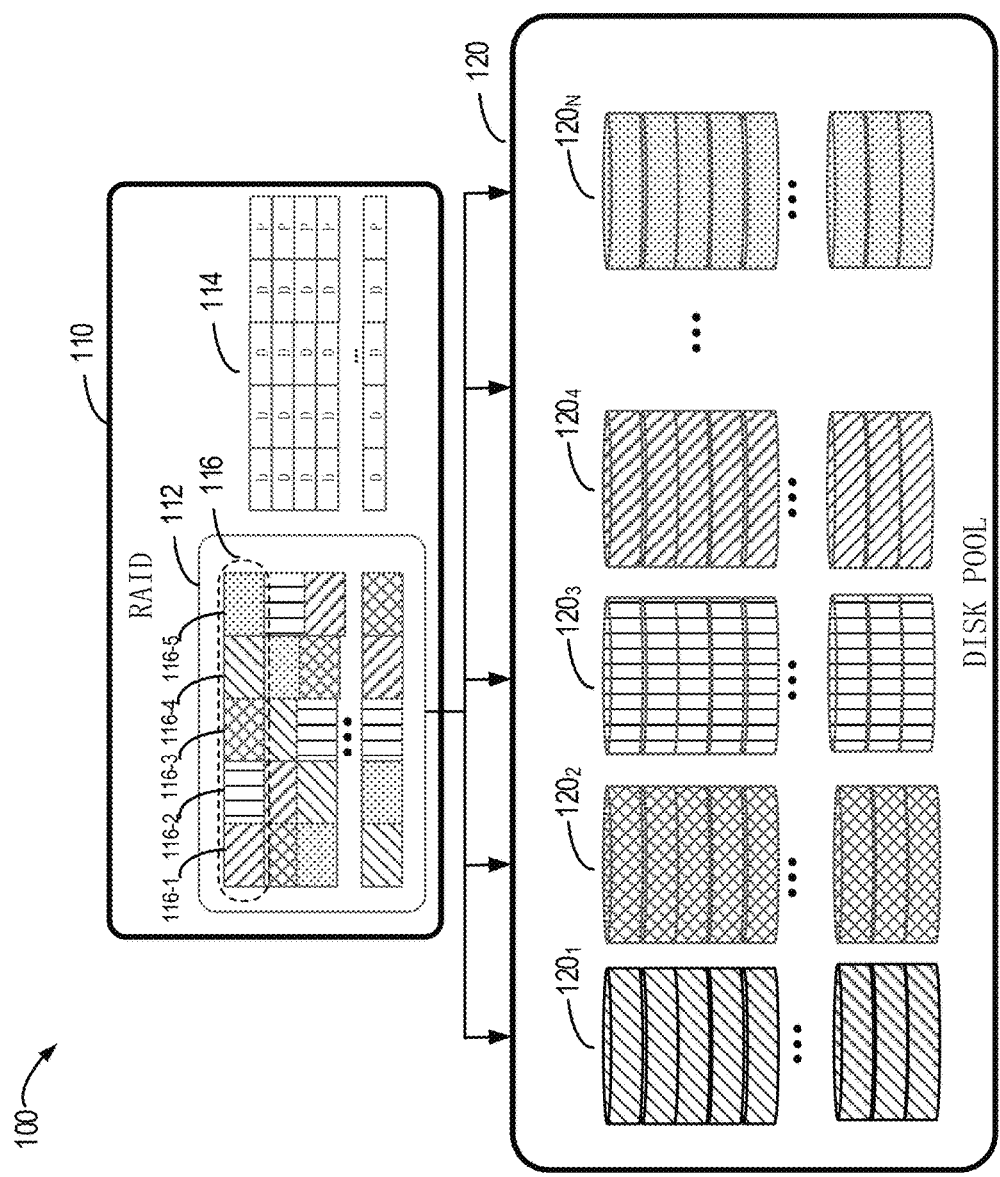
FIG. 1 illustrates a diagram of a traditional mapped RAID system.

Principles of the present disclosure will be described with reference to several example embodiments illustrated in the drawings. Although the drawings illustrate preferred embodiments of the present disclosure, it is to be appreciated that description of these embodiments is merely to enable those skilled in the art to better understand and implement the present disclosure and is not intended to limit the scope disclosed herein in any manner.

As described above, the mapped RAID is a new RAID technology. Unlike the traditional RAID, the mapped RAID is created on top of a disk pool, instead of being created on several specific disks. As compared with the traditional RAID, it has several advantages, such as capability of being rebuilt more rapidly, support of a single drive extension and support of drives of mixed sizes in a disk pool.

FIG. 1 illustrates a diagram of a traditional mapped RAID system 100. The system 100 includes a disk pool 120 and a RAID 110 created on the disk pool 120. In the system 100 as shown in FIG. 1, the disk pool 120 includes N disks $120_1$, $120_2$, $120_3$, $120_4$ ... $120_N$, where N is dependent on the RAID policy as employed. For example, if an R5 policy of 4D+1P is used, N is an integer greater than or equal to 5. If an R6 policy of 4D+2P is used, N is an integer greater than or equal to 6. Each of the disks $120_1$, $120_2$, $120_3$, $120_4$ ... $120_N$ is divided into a series of fixed-sized, non-overlapping segments, which are referred to as disk extents. In the actual implementations, depending on memory limitation, the disk extents may be set to have different sizes.

A logical space of the RAID 110 is divided into a bunch of continuous, non-overlapping segments which are referred to as RAID extents. Each RAID extent 116 consists of a predetermined number of disk extents which are selected from different disks of N disks $120_1$, $120_2$, $120_3$, $120_4$ ... $120_N$. The predetermined number is dependent on the selected RAID policy. For example, if the R5 policy of 4D+1P is used, the predetermined number is 5, as shown in FIG. 1. Those skilled in the art would appreciate that the numerical value 5 is only an example, and the predetermined number may be taken as different values depending on different RAID policies. In the system 100 as shown in FIG. 1, the RAID extent 116 as shown therein consists of a disk extent 116-1 of the disk $120_4$, a disk extent 116-2 of the disk $120_3$, a disk extent 116-3 of the disk $120_2$, a disk extent 116-4 of the disk $120_1$ and a disk extent 116-5 of the disk $120_N$. A plurality of RAID extents 116 may form a RAID extent group 112. The RAID 110 further includes a mapping table 114 for recording which disk extents of which disks each RAID extent 116 in the RAID extent group 112 in the RAID 110 consists of.

Currently, when the RAID extent group 112 is created, a so-called neighborhood matrix algorithm is used, in order that the disk extents included in each RAID extent in the RAID extent group 112 are distributed evenly as much as possible among N disks $120_1$, $120_2$, $120_3$, $120_4$ ... $120_N$. The neighborhood matrix M is an N*N square matrix, where N is a number of disks in the disk pool, which is dependent on the used RAID policy, as described above. Each element M (i, j) in the matrix represents how many times the disk i has ever neighbored with the disk j in the RAID 110. If a disk extent in the disk i and a disk extent in the disk j are simultaneously present in the same RAID extent, it is defined that the disk i and the disk j neighbor with each other once. For example, in the system 100 as shown in FIG. 1, the RAID extent 116 as shown therein consists of disk extents from the disk $120_4$, the disk $120_3$, the disk $120_2$, the disk $120_1$ and the disk $120_N$. Correspondingly, the disk $120_4$ neighbors with the disk $120_3$, the disk $120_2$, the disk $120_1$ and the disk $120_N$, respectively, and the disk $120_3$ neighbors with the disk $120_4$, the disk $120_2$, the disk $120_1$ and the disk $120_N$, respectively, and so forth. From the definition of the neighborhood matrix, it can be obtained that the neighborhood matrix is a symmetric matrix.

If the disk extents included in the RAID extent group 112 in the RAID 110 are distributed evenly in the disk pool, each element in the neighborhood matrix M should be close to each other. Therefore, an objective of the neighborhood matrix algorithm is to enable each element in the neighborhood matrix M to be substantially identical after the RAID extent distribution has been completed.

Figure 2A:
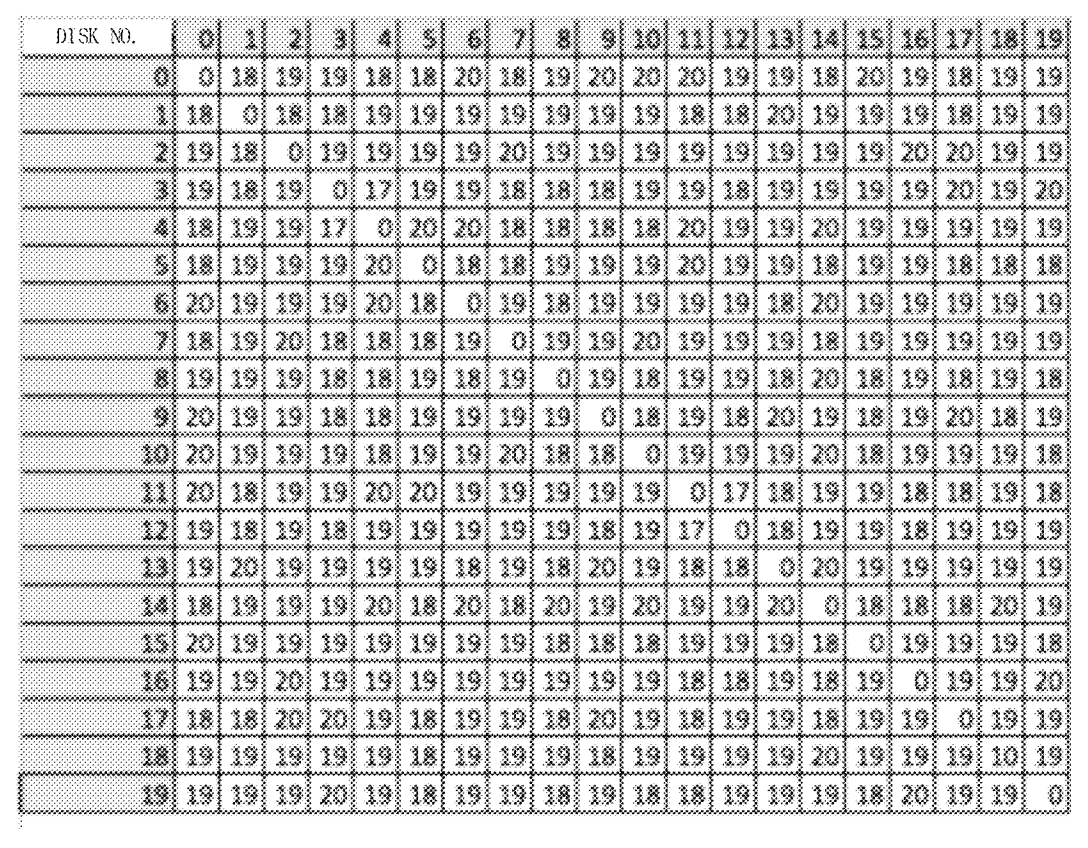
Figure 2B:
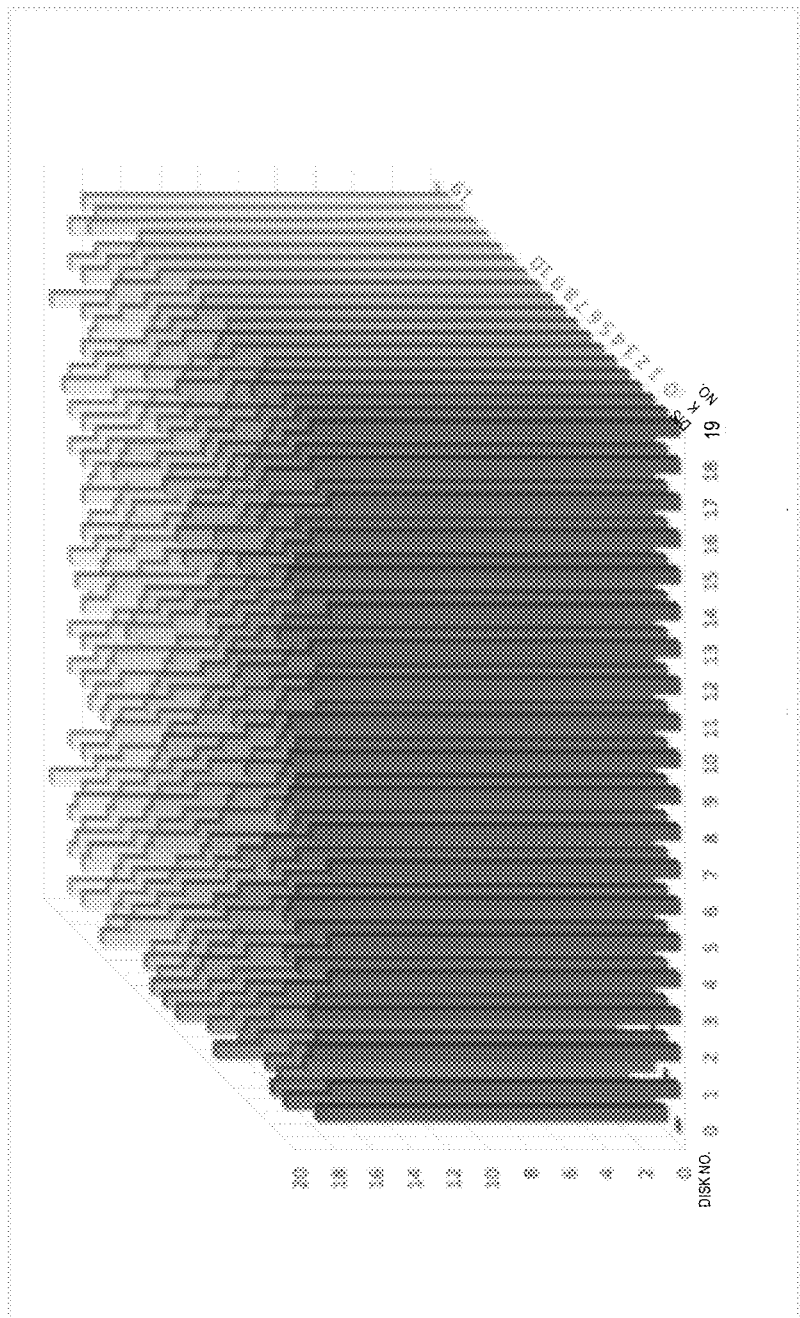
FIG. 2B illustrates visually a diagram of a neighborhood matrix corresponding to an evenly distributed RAID in a 3-dimensional form.

FIG. 2A and FIG. 2B illustrate visually a neighborhood matrix with elements being substantially identical to each other in a 2-dimensional form and in a 3-dimensional form, respectively. In the examples of FIG. 2A and FIG. 2B, the number N of the disks in the pool 120 is 20. As shown in FIG. 2A and FIG. 2B, after the neighborhood matrix algorithm is performed, elements in the matrix have substantially identical values, i.e., the RAIDs corresponding to the neighborhood matrix as shown in FIG. 2A and FIG. 2B are distributed evenly in the disk pool. When the RAIDs obtained through the neighborhood matrix algorithm and evenly distributed on individual disks are used, an IO pressure on each disk is substantially the same. The problem lies in that, if the mapped RAID is created using disks having different wear levels (for example, solid-state disks), the algorithm may result in life cycles of some disks being terminated faster than those of other disks, thereby probably rendering data loss. The problem is explained below with Table 1 as an example, in which entries of the first row denote the disk (0 to 19) and entries of the second row denote the corresponding wear level in percent.

TABLE 1

| 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|----|----|----|----|----|----|----|----|----|----|
| 20 | 20 | 10 | 20 | 20 | 20 | 80 | 20 | 20 | 60 | 20 | 20 | 20 | 60 | 20 | 20 | 20 | 20 | 20 | 20 |

In Table 1, respective wear levels of 20 disks for creating the RAID are shown, and for example, the wear level of the disk 6 is 80%, and the wear levels of the disk 9 and the disk 13 are 60%. It is to be appreciated that the number of disks and the numerical representations of the respective wear levels as shown in Table 1 are only exemplary, and in the actual use, each disk may exhibit a different wear level. In Table 1, if a wear level of a disk reaches 100%, the life cycle of the disk will be terminated. The RAID is created on the disk pool consisting of 20 disks as shown in Table 1 by using the current neighborhood matrix algorithm, and the neighborhood matrix when the RAID extent group is distributed evenly on the disk pool is identical to the one shown in FIG. 2A and FIG. 2B. When the RAID created in this manner is used subsequently, the IO pressure on each disk is substantially the same, such that the wear rate is also substantially identical. After the disk pool has provided service for data reading and data writing for a period of time, the life cycle of the disk 6 is first terminated, and a new disk is then swapped in. After a period of time, the life cycles of the disk 9 and the disk 13 may be terminated consecutively in a short period. In this case, if the mapped RAID has not finished duplicating the data to the new disk which is swapped in, data loss will occur.

Furthermore, in the existing solution, the user is informed of whether a new disk needs to be swapped in by selecting the highest wear level of the disk. For example, in the example as shown in Table 1, in the disk pool, the disk 6 has a wear level of 80%, while there are also lots of disks having wear levels of 10%, 20%, and these disks with low wear levels can still be in service for many years. However, what the user can see is that the wear level of the RAID has reached 80%, the life cycle is to be terminated and there is a need for data backup. This will mislead the user to make improper decisions.

In order to solve the above problem, embodiments of the present disclosure provide a disk wear level-based neighborhood matrix algorithm for creating RAID extents to reduce the risks of data loss. In the embodiments of the present disclosure, when the RAID is created, respective spare extents are allocated in disk extents of a plurality of disks based on wear levels of respective disks in the disk pool, such that a number of spare extents in a disk is positively correlated with the wear level of the disk, and the RAID then is created based on the disk extents other than the spare extents in the disk pool. As such, in a case that each disk has the same number of disk extents, there is a smaller number of disk extents involved in creation of the RAID in the disk having a higher wear level, so that the disk can be worn out more slowly in the subsequent use of the RAID, thereby prolonging the life cycle of the disk, and further avoiding frequent replacement of the disk having a terminated life cycle with a new disk and reducing the cases of data loss.

Figure 3:
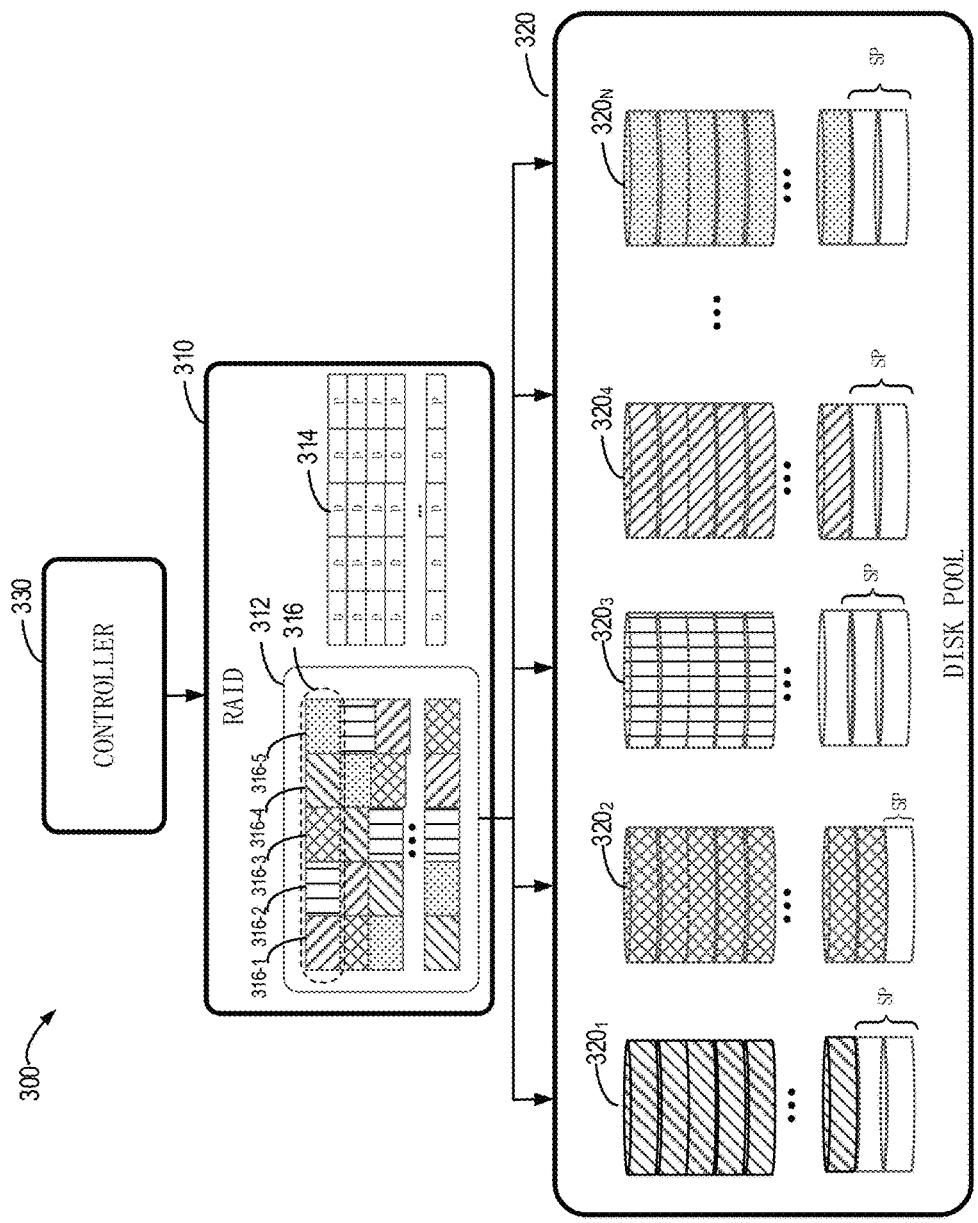
FIG. 3 illustrates a diagram of a mapped RAID system according to embodiments of the present disclosure.

The embodiments of the present disclosure will be described below with reference to FIG. 3. FIG. 3 illustrates a diagram of a mapped RAID system 300 according to embodiments of the present disclosure. It is to be appreciated that some components shown in FIG. 3 may be omitted, and the system 300 may include other components not shown therein, in other embodiments. That is, the diagram of FIG. 3 is only provided for describing the embodiments of the present disclosure in an example environment, to help those skilled in the art understand the mechanism and principles described herein, with no intention to limit the scope of the present disclosure in any manner.

The system 300 includes a disk pool 320, a RAID 310 created on top of the disk pool 320 and a controller 330. The disk pool 320 includes N disks $320_1$, $320_2$, $320_3$, $320_4$ . . . $320_N$, where N is dependent on the used RAID policy. For example, when the R5 policy of 4D+1P is used, N is an integer greater than or equal to 5, and when the R6 policy of 4D+2P is used, N is an integer greater than or equal to 6. Each of the disks $320_1$, $320_2$, $320_3$, $320_4$ . . . $320_N$ is divided into a series of fixed-sized, non-overlapping disk extents. In the embodiments of the present disclosure, the disks $320_1$, $320_2$, $320_3$, $320_4$ . . . $320_N$ have the same capacity, and each disk includes the same number of disk extents. In the embodiments of the present disclosure, each disk extent has a size of 10 GB-50 GB, but this is only exemplary and any other numerical value is possible. Those skilled in the art would appreciate that the embodiments of the present disclosure are also applicable to a plurality of disks having different capacities.

The logical space of the RAID 310 is divided into a group of continuous, non-overlapping RAID extents. Each RAID extent 316 consists of a predetermined number of disk extents selected from different disks of the N disks $320_1$, $320_2$, $320_3$, $320_4$ . . . $320_N$. The predetermined number is dependent on the used RAID policy. For example, when the R5 policy of 4D+1P is used, the predetermined number is 5. Those skilled in the art would appreciate that the numerical value 5 is only an example, and the predetermined number may be set to be a different value depending on the different RAID policy. In the example shown in FIG. 3, the RAID extent 316 as shown therein consists of a disk extent 316-1 of the disk $320_4$, a disk extent 316-2 of the disk $320_3$, a disk extent 316-3 of the disk $320_2$, a disk extent 316-4 of the disk $320_1$ and a disk extent 316-5 of the disk $320_N$. A plurality of RAID extents 316 may form a RAID extent group 312. The RAID 310 further includes a mapping table 314 for recording which disk extents of which disks each RAID extent in the RAID extent group 312 consists of.

Unlike the traditional storage system 100 as shown in FIG. 1, in response to receiving a request to create the RAID extent group 312 on the disk pool 320, the controller 330 determines a number of spare extents SP in each disk of disks $320_1$, $320_2$, $320_3$, $320_4$ . . . $320_N$, based on a wear level of the disk, such that the disk having a higher wear level is provided with more spare extents SP. For example, in the example as shown in FIG. 3, the disk $320_3$ is provided with more spare extents SP due to its higher wear level. In the embodiments of the present disclosure, for a given disk of the N disks $320_1$, $320_2$, $320_3$, $320_4$ . . . $320_N$, the controller 330 determines a number of spare extents SP of the given disk, based on the wear level of the given disk, an average wear level of the N disks $320_1$, $320_2$, $320_3$, $320_4$ . . . $320_N$ and an average number of spare extents.

The controller 330 creates the RAID 310 using a traditional neighborhood matrix algorithm based on the disk extents other than the spare extents SP in the disk pool 310. A number of spare extents SP is determined based on the wear level, such that for disks $320_1$, $320_2$, $320_3$, $320_4$ . . . $320_N$ having different wear levels, there are different numbers of disk extents involved in creation of the RAID extent group 312. Hence, there is a small number of disk extents from the disk having a high wear level to be involved in creation of the RAID extent group 312, such that the disk is worn out relatively slowly during use of the created RAID group 312, thereby prolonging the life cycle of the disk having a higher wear level.

Figure 4:
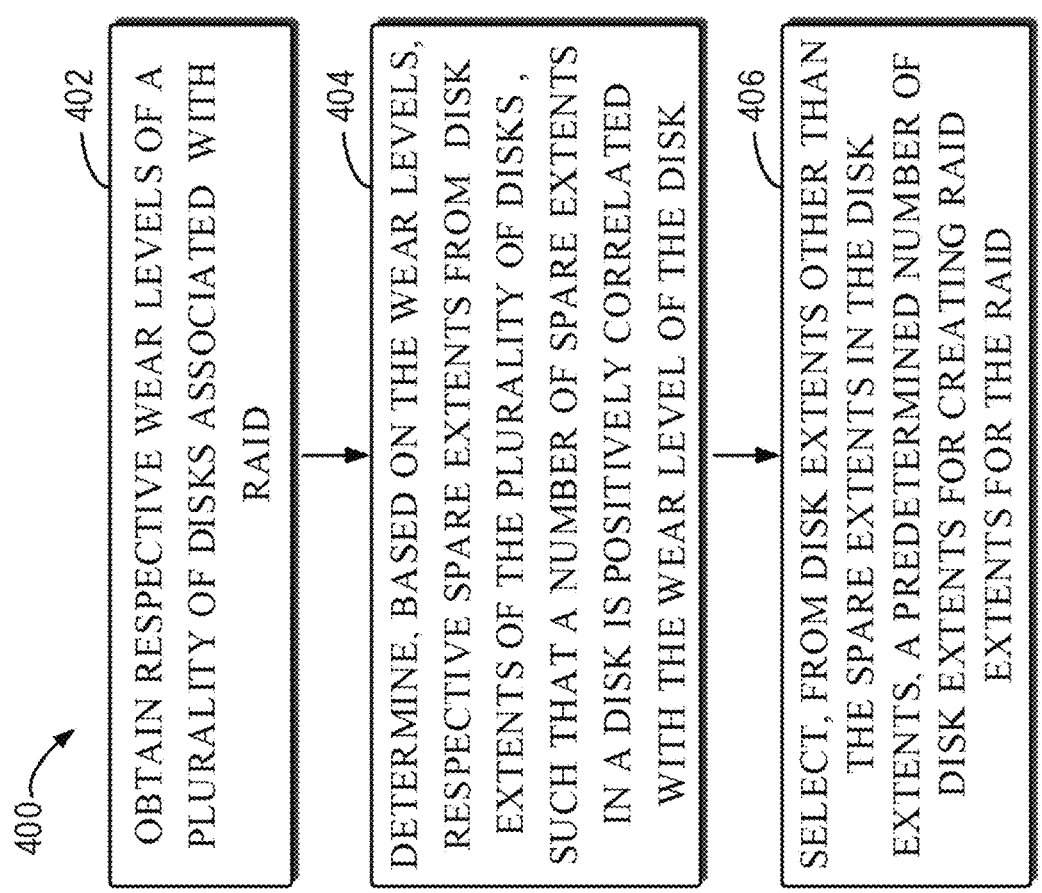
FIG. 4 illustrates a flowchart of a method of storage allocation according to embodiments of the present disclosure.

FIG. 4 illustrates a flowchart of a method 400 of storage allocation according to embodiments of the present disclosure. The method 400 can be performed by the controller 330 in FIG. 3. The controller 330 can perform the method 400, in response to receiving a request to create the RAID extent group 312 on the disk pool 320. In 402, the controller 330 obtains respective wear levels $W_1$, $W_2$ . . . $W_N$ of a plurality of disks $320_1$, $320_2$, $320_3$, $320_4$ . . . $320_N$ associated with RAID 310, where N is a number of disks in the disk pool 320, which is dependent on the used RAID policy, as described above.

In 404, the controller 330 determines respective spare extents SP in the disk extents of a plurality of disks $320_1$, $320_2$, $320_3$, $320_4$ . . . $320_N$, based on the obtained wear levels $W_1$, $W_2$ . . . $W_N$, such that the number of spare extents in a disk is positively correlated with the wear level of the disk. In the embodiments of the present disclosure, the disk having a higher wear level is provided with more spare extents SP which are not involved in creation of the RAID. The process of determining spare extents of a given disk based on a wear level will be described below in detail with reference to FIG. 5.

In 406, the controller 330 selects a predetermined number of disk extents from the disk extents other than the spare extents SP in a plurality of disks $320_1$, $320_2$, $320_3$, $320_4$ ... $320_N$, for creating the RAID extent 316 of the RAID 310, and the predetermined number of disk extents are from different disks. As described above, the predetermined number is dependent on the used RAID policy. For example, when the R5 policy of 4D+1P is used, the predetermined number is 5. Those skilled in the art would appreciate that the R5 policy is only an example, and in practice, a different RAID policy may be used, and thus the predetermined number is varied. Since the disk having a higher wear level is provided with more spare extents, there are fewer disk extents to be used for creating the RAID 310, such that the disk is worn out slowly in the subsequent use of the RAID 310, thereby prolonging the life cycle of the disk, and further avoiding frequent replacement of the disk having a terminated life cycle with a new disk and reducing the cases of data loss.

In one embodiment of the present disclosure, for a given disk of the plurality of disks $320_1$, $320_2$, $320_3$, $320_4$ ... $320_N$, the controller 330 can compare the wear level of the given disk with a predetermined threshold. The predetermined threshold can be set according to actual needs. In response to the wear level of the given disk being greater than the predetermined threshold, the controller 330 removes the given disk from the disk pool 320, and adds to the disk pool 320 a new disk having a wear level less than the predetermined threshold, for creating the RAID 310. Since the disks having the wear level greater than the predetermined threshold are removed from the disk pool 320, they are not involved in creation of the RAID 320, thereby preventing an inefficient storage allocation caused by allocating too many spare extents to these disks.

In one embodiment of the present disclosure, during use of the created RAID 310, an average wear level of the plurality of disks $320_1$, $320_2$, $320_3$, $320_4$ ... $320_N$ can be monitored in real time, and the monitored average wear level is reported to the user, so as to prompt the user on whether there is a need to swap in a new disk, thereby allowing the user to take appropriate measures.

Figure 5:
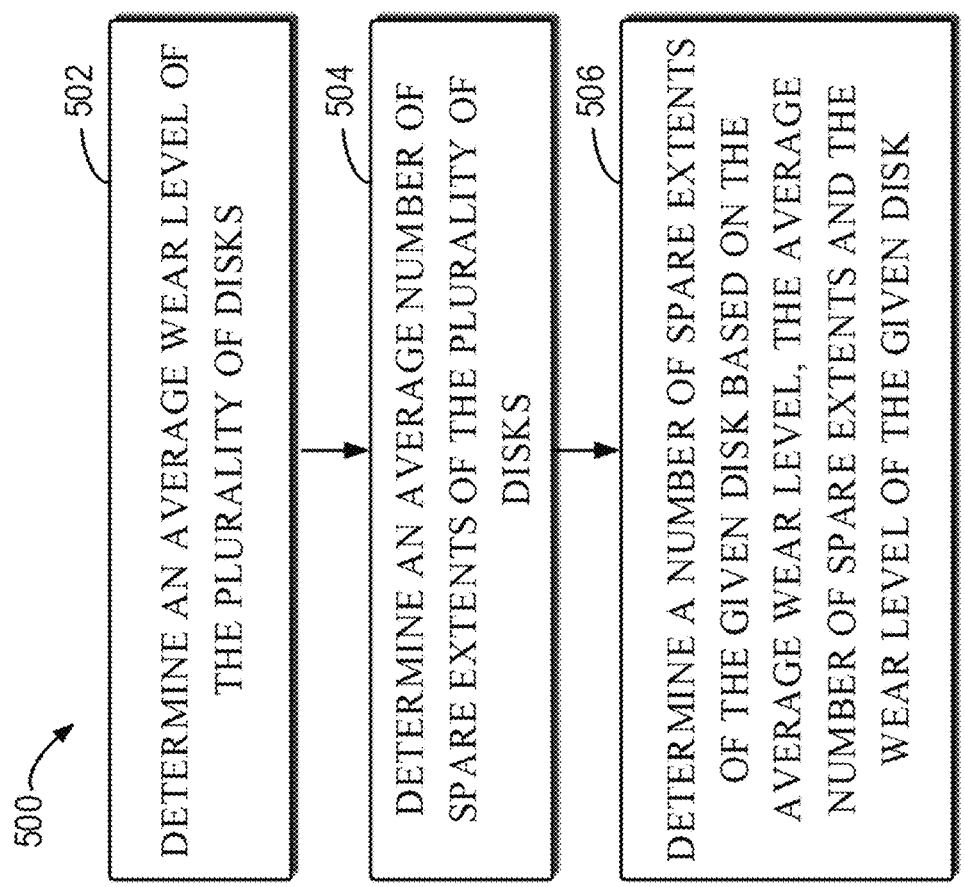
FIG. 5 illustrates a flowchart of determining a number of spare extents of a given disk according to embodiments of the present disclosure.

FIG. 5 illustrates a flowchart of a method 500 of determining a number of spare extents of a given disk according to embodiments of the present disclosure. The method 500 is a specific implementation of 404 as shown in FIG. 4. Those skilled in the art would appreciate that the method 500 is only an example method of determining a number of spare extents of a given disk. The embodiments of the present disclosure are not limited to this.

In 502, the controller 330 determines an average wear level of a plurality of disks $320_1$, $320_2$, $320_3$, $320_4$ ... $320_N$. In an embodiment of the present disclosure, the controller 330 determines the average wear level of the plurality of disks $320_1$, $320_2$, $320_3$, $320_4$ ... $320_N$ through the following equation:

$$W_a = \frac{W_1 + W_2 + W_3 + \ldots + W_N}{N} \quad (1)$$

where $W_1, W_2 \ldots W_N$ represent wear levels of the plurality of obtained disks $320_1$, $320_2$, $320_3$, $320_4$ ... $320_N$, respectively, N represents a number of disks, and $W_a$ represents an average wear level of the plurality of disks $320_1$, $320_2$, $320_3$, $320_4$ ... $320_N$.

In 504, the controller 330 determines an average number of spare extents of the plurality of disks $320_1$, $320_2$, $320_3$, $320_4$ ... $320_N$. In an embodiment of the present disclosure, the controller 330 determines a spare capacity in the disk pool 320, based on a total capacity of the plurality of disks $320_1$, $320_2$, $320_3$, $320_4$ ... $320_N$ and a capacity required for the RAID 310 to be created. The controller 330 determines the average number of spare extents of each disk based on the determined spare capacity. In an example embodiment of the present disclosure, the controller 330 can determine the average number of spare extents of the plurality of disks $320_1$, $320_2$, $320_3$, $320_4$ ... $320_N$ through the following equation:

$$P_{avg} = \frac{S_d * N - S_{req}}{S_{DE} * N} \quad (2)$$

where $P_{avg}$ represents an average number of spare extents of the plurality of disks $320_1$, $320_2$, $320_3$, $320_4$ ... $320_N$, $S_{req}$ represents the required capacity of the RAID 310, $S_d$ represents a capacity of each disk in the disk pool 320, N represents a number of disks in the disk pool 320, and $S_{DE}$ represents a capacity of each disk extent. The equation (2) is only an example, and those skilled in the art would appreciate that the average number of spare extents can be determined in different manners. In 506, for a given disk, the controller 330 determines a number of spare extents of the given disk based on the average wear level, the average number of spare extents and the wear level of the given disk.

In one embodiment of the present disclosure, in response to the wear level of the given disk being equal to the average wear level, the controller 330 determines the number of the spare extents of the given disk to be equal to the average number of spare extents. In response to the wear level of the given disk being greater than the average wear level, the controller 330 determines the number of the spare extents of the given disk to be greater than the average number of spare extents. In response to the wear level of the given disk being less than the average wear level, the controller 330 determines the number of the spare extents of the given disk to be less than the average number of spare extents.

In the embodiments of the present disclosure, there may be various ways of determining the number of the spare extents of the disk based on the average wear level, the average number of spare extents and the wear level of the given disk. The controller 330 can determine the number $P_i$ of the spare extents of the given disk i through the following equation:

$$P_i = f(P_{avg}, W_a, W_i) \quad (3)$$

where the function f is an increasing function of a wear level $W_i$ of the given disk i, and when $W_i$ is equal to $W_a$, the function value is the average number of spare extents $P_{avg}$. Those skilled in the art would appreciate that there is a plurality of functions f satisfying the requirement. For example, and without limitation, the following equation (4) is a function satisfying the requirement:

$$P_i = P_{avg} * \frac{W_i}{W_a} \quad (4)$$

Figure 6:
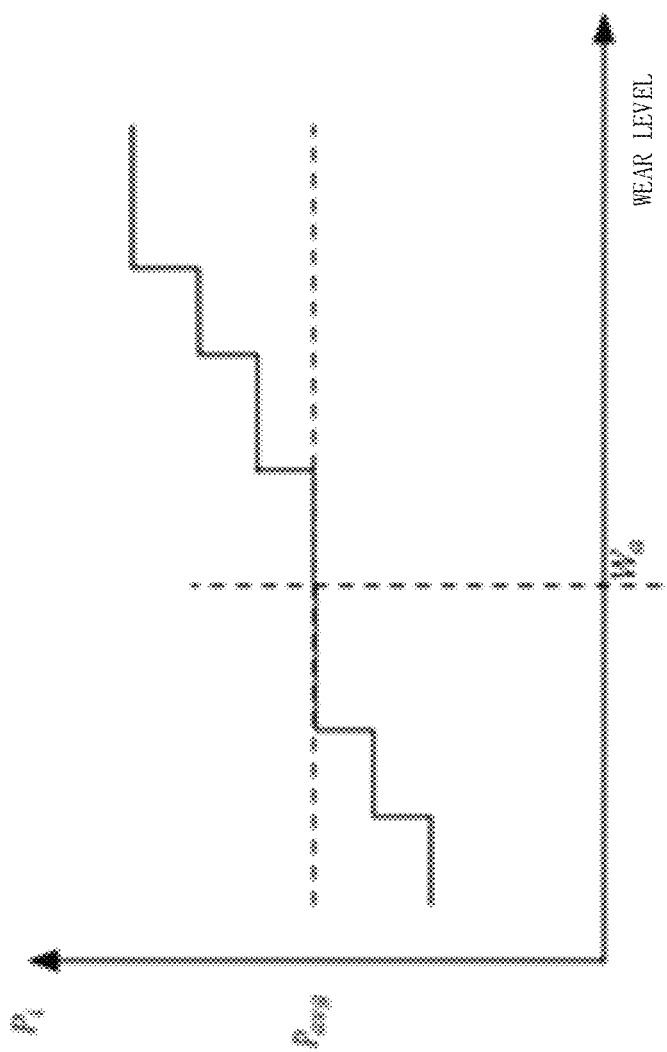
FIG. 6 illustrates a graph of a number of spare extents of a given disk versus a wear level according to embodiments of the present disclosure.

The equation (4) is only an example function, and there are various functions satisfying the requirement in practice. For example, FIG. 6 illustrates a graph of a further function satisfying the requirement. Without departing from the general conception of the embodiments of the present disclosure, those skilled in the art could envision various functions of determining a number of spare extents of a given disk based on a wear level of the given disk, an average wear level and an average number of spare extents, as long as the function is an increasing function of the wear level of the given disk and has a value equal to the average number of spare extents at the average wear level, which is not limited to the equation (4).

In the embodiments of the present disclosure, in a case that two given disks have the same wear level, for one given disk, a ceiling rounding operation is performed on the value determined through the equation (3), while, for the other given disk, a floor rounding operation is performed on the value determined through the equation (3), such that the number of spare extents of the two given disks having the same wear level are slightly different, thereby ensuring the total number of spare extents of the disks satisfies the requirement of the system.

According to the method 500, in the process of determining the number of the spare extents of the given disk, the average wear level of each disk and the average number of spare extents of the disks are taken into account, thereby ensuring that the number of the disk extents involved in creation of the RAID can satisfy the required capacity of the RAID when the disk having a higher wear level is provided with more spare extents.

Figure 7:
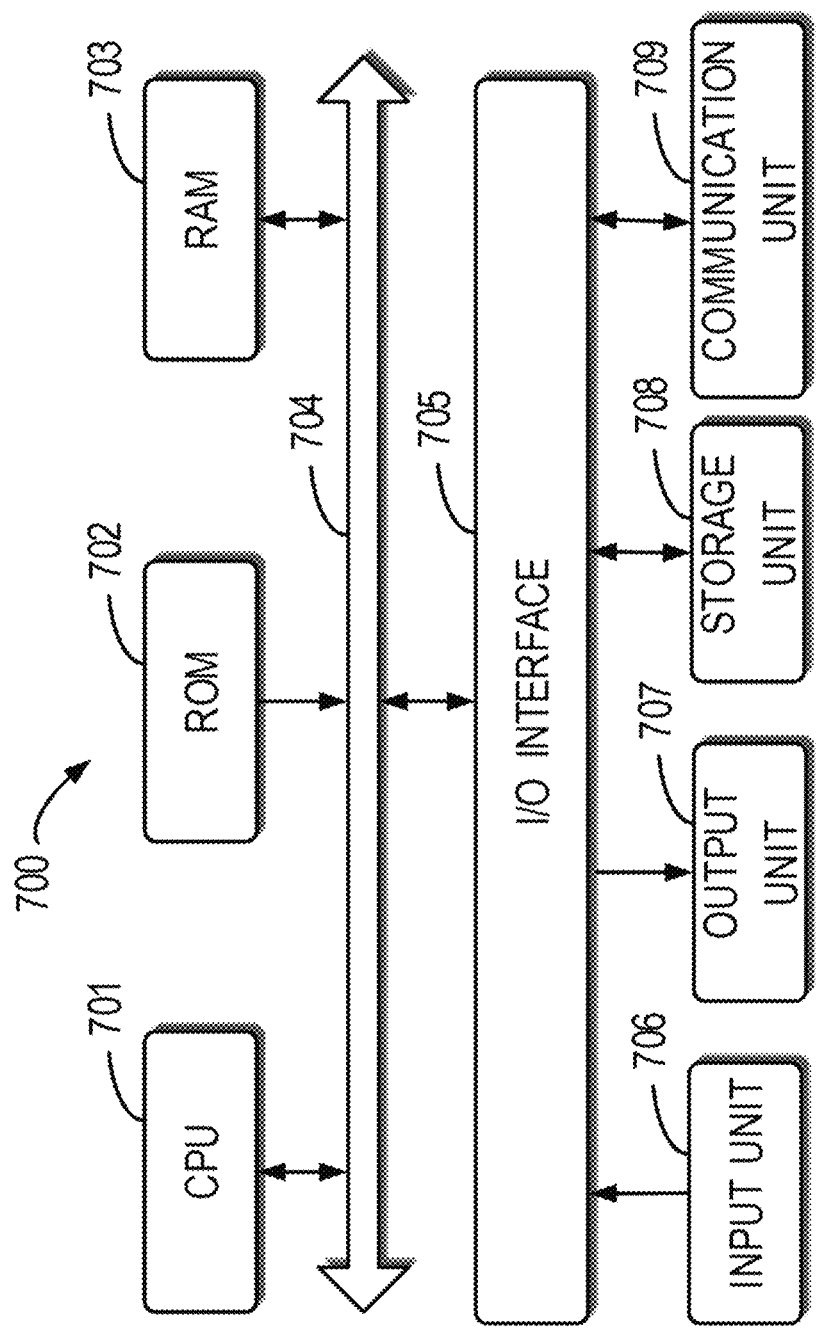
FIG. 7 illustrates a block diagram of an example device for implementing embodiments of the present disclosure.

FIG. 7 illustrates an example block diagram of an example device 700 for implementing embodiments of the present disclosure. The device 700 can be used to implement the controller 330 in FIG. 3. As shown, the device 700 includes a central processing unit (CPU) 701 that can perform various appropriate acts and processing based on computer program instructions stored in a read-only memory (ROM) 702 or computer program instructions loaded from a storage unit 708 to a random access memory (RAM) 703. RAM 703 further stores various programs and data needed for operations of the device 700. The CPU 701, ROM 702 and RAM 703 are connected to each other via a bus 704. An input/output (I/O) interface 705 is also connected to the bus 704.

The following components in the device 700 are connected to the I/O interface 705: an input unit 706, such as a keyboard, a mouse and the like; an output unit 707, such as various kinds of displays and a loudspeaker, etc.; a storage unit 708, such as a magnetic disk, an optical disk, and etc.; a communication unit 709, such as a network card, a modem, and a wireless communication transceiver, etc. The communication unit 709 allows the device 700 to exchange information/data with other devices through a computer network such as the Internet and/or various kinds of telecommunications networks.

Various processes and processing described above, e.g., the method 400 and/or the method 500, can be executed by the processing unit 701. For example, in some embodiments, the method 400 and/or the method 500 can be implemented as a computer software program that is tangibly embodied on a machine readable medium, e.g., the storage unit 708. In some embodiments, part or all of the computer programs can be loaded and/or mounted onto the device 700 via ROM 702 and/or communication unit 709. When the computer program is loaded into the RAM 703 and executed by the CPU 701, one or more steps of the method 400 and/or the method 500 as described above can be executed. Alternatively, in other embodiments, the CPU 701 can be configured in any other appropriate manner (for example, by means of firmware) to perform the method 400 and/or the method 500.

The functionally described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program codes for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program codes may execute entirely on a machine, partly on the machine, as a stand-alone software package, partly on the machine and partly on a remote machine or entirely on the remote machine or server.

In the context of the present disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but is not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular implementations. Certain features that are described in the context of separate implementations may also be implemented in combination in a single implementation. Conversely, various features that are described in the context of a single implementation may also be implemented in multiple implementations separately or in any suitable sub-combination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

What is claimed is:

1. A method comprising:
defining a pool of storage drives for storing data in accordance with a mapped redundant array of independent disks (RAID) arrangement;
determining wear levels of respective ones of the storage drives in the pool; and
allocating different numbers of spare extents to different ones of the storage drives in the pool based at least in part on their respective wear levels;
wherein the method is performed by at least one processing device comprising a processor coupled to a memory.

2. The method of claim 1 further comprising selecting particular extents other than the allocated spare extents from particular ones of the storage drives for use in the mapped RAID arrangement.

3. The method of claim 1 wherein a first one of the storage drives having a relatively high wear level is allocated a higher number of spare extents than a second one of the storage drives having a relatively low wear level.

4. The method of claim 1 wherein the numbers of spare extents allocated to respective ones of the storage drives are positively correlated with the respective wear levels of those storage drives.

5. The method of claim 1 wherein each of the storage drives in the pool comprises a plurality of drive extents with each such drive extent comprising a fixed-sized, non-overlapping segment of a storage space of the storage drive and wherein the plurality of drive extents of a given one of the storage drives comprises the spare extents allocated to that storage drive and other ones of the drive extents selected for utilization in the mapped RAID arrangement.

6. The method of claim 5 wherein the mapped RAID arrangement comprises a plurality of RAID extents with each such RAID extent comprising a fixed-sized, non-overlapping segment of the mapped RAID arrangement and wherein a given one of the RAID extents comprises a designated number of drive extents selected from different ones of the storage drives.

7. The method of claim 1 wherein allocating different numbers of spare extents to different ones of the storage drives in the pool based at least in part on their respective wear levels comprises:
determining an average wear level of storage drives in the pool;
determining an average number of spare extents of the storage drives in the pool; and
allocating a particular number of spare extents to a given one of the storage drives in the pool based at least in part on the average wear level, the average number of spare extents and the wear level of the given storage drive.

8. The method of claim 7 wherein allocating a particular number of spare extents to the given storage drive comprises:
in response to the wear level of the given storage drive being equal to the average wear level, determining the number as equal to the average number of spare extents;
in response to the wear level of the given storage drive being greater than the average wear level, determining the number as greater than the average number of spare extents; and
in response to the wear level of the given storage drive being less than the average wear level, determining the number as less than the average number of spare extents.

9. The method of claim 7 wherein determining the average number of spare extents of the storage drives in the pool comprises:
determining a total capacity of the spare extents based on a difference between a total capacity of the storage drives and a capacity required for the mapped RAID arrangement;
determining a total number of the spare extents based on a ratio of the total capacity of the spare extents to a capacity of a single extent; and
determining the average number of spare extents based on a ratio of the total number of the spare extents to a total number of the storage drives.

10. An apparatus comprising:
at least one processing device comprising a processor coupled to a memory;
said at least one processing device being configured:
to define a pool of storage drives for storing data in accordance with a mapped redundant array of independent disks (RAID) arrangement;
to determine wear levels of respective ones of the storage drives in the pool; and
to allocate different numbers of spare extents to different ones of the storage drives in the pool based at least in part on their respective wear levels.

11. The apparatus of claim 10 further comprising selecting particular extents other than the allocated spare extents from particular ones of the storage drives for use in the mapped RAID arrangement.

12. The apparatus of claim 10 wherein a first one of the storage drives having a relatively high wear level is allocated a higher number of spare extents than a second one of the storage drives having a relatively low wear level.

13. The apparatus of claim 10 wherein the numbers of spare extents allocated to respective ones of the storage drives are positively correlated with the respective wear levels of those storage drives.

14. The apparatus of claim 10 wherein allocating different numbers of spare extents to different ones of the storage drives in the pool based at least in part on their respective wear levels comprises:
determining an average wear level of storage drives in the pool;
determining an average number of spare extents of the storage drives in the pool; and
allocating a particular number of spare extents to a given one of the storage drives in the pool based at least in part on the average wear level, the average number of spare extents and the wear level of the given storage drive.

15. A computer program product comprising a non-transitory processor-readable storage medium having stored therein program code of one or more software programs, wherein the program code, when executed by at least one processing device comprising a processor coupled to a memory, causes said at least one processing device:
to define a pool of storage drives for storing data in accordance with a mapped redundant array of independent disks (RAID) arrangement;
to determine wear levels of respective ones of the storage drives in the pool; and to allocate different numbers of spare extents to different ones of the storage drives in the pool based at least in part on their respective wear levels.

16. The computer program product of claim 15 wherein the program code when executed by said at least one processing device further causes said at least one processing device to select particular extents other than the allocated spare extents from particular ones of the storage drives for use in the mapped RAID arrangement.

17. The computer program product of claim 15 wherein a first one of the storage drives having a relatively high wear level is allocated a higher number of spare extents than a second one of the storage drives having a relatively low wear level.

18. The computer program product of claim 15 wherein the numbers of spare extents allocated to respective ones of the storage drives are positively correlated with the respective wear levels of those storage drives.

19. The computer program product of claim 15 wherein allocating different numbers of spare extents to different ones of the storage drives in the pool based at least in part on their respective wear levels comprises:
   determining an average wear level of storage drives in the pool;
   determining an average number of spare extents of the storage drives in the pool; and
   allocating a particular number of spare extents to a given one of the storage drives in the pool based at least in part on the average wear level, the average number of spare extents and the wear level of the given storage drive.

20. The computer program product of claim 19 wherein allocating a particular number of spare extents to the given storage drive comprises:
   in response to the wear level of the given storage drive being equal to the average wear level, determining the number as equal to the average number of spare extents;
   in response to the wear level of the given storage drive being greater than the average wear level, determining the number as greater than the average number of spare extents; and
   in response to the wear level of the given storage drive being less than the average wear level, determining the number as less than the average number of spare extents.

* * * * *